US009210649B2

(12) United States Patent (10) Patent No.: US 9,210,649 B2
Tervonen et al. (45) Date of Patent: Dec. 8, 2015

(54) NETWORK SELECTION MECHANISMS

(75) Inventors: Janne Petteri Tervonen, Espoo (FI); Jari Pekka Mustajarvi, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 77 days.

(21) Appl. No.: 13/499,373

(22) PCT Filed: Oct. 2, 2009

(86) PCT No.: PCT/EP2009/062796
§ 371 (c)(1),
(2), (4) Date: Jun. 18, 2012

(87) PCT Pub. No.: WO2011/038771
PCT Pub. Date: Apr. 7, 2011

(65) Prior Publication Data
US 2012/0264412 A1    Oct. 18, 2012

(51) Int. Cl.
*H04W 48/08* (2009.01)
*H04W 48/14* (2009.01)
*H04W 48/18* (2009.01)

(52) U.S. Cl.
CPC .............. *H04W 48/08* (2013.01); *H04W 48/14* (2013.01); *H04W 48/18* (2013.01)

(58) Field of Classification Search
CPC ....... H04W 8/245; H04W 92/02; H04W 8/12; H04W 56/00; H04L 2012/2607; G06F 17/30286; G06F 17/30864; G06F 17/30067; H04Q 3/42
USPC ........... 455/418, 432.3, 433; 370/310.2–350; 379/280, 355.02, 355.04; 707/609, 707/705, 790–793, 821
See application file for complete search history.

(56) References Cited

U.S. PATENT DOCUMENTS

| 7,065,367 | B2 * | 6/2006 | Michaelis et al. | 455/452.2 |
| 8,185,152 | B1 * | 5/2012 | Goldner | 455/552.1 |
| 8,391,238 | B2 * | 3/2013 | Rune et al. | 370/331 |
| 2008/0037501 | A1 * | 2/2008 | Ali et al. | 370/342 |
| 2008/0046963 | A1 * | 2/2008 | Grayson et al. | 726/1 |
| 2008/0318580 | A1 * | 12/2008 | Zhong et al. | 455/444 |
| 2011/0085498 | A1 * | 4/2011 | Oba et al. | 370/328 |

FOREIGN PATENT DOCUMENTS

| CN | 101374295 A | 2/2009 |
| CN | 101541064 A | 9/2009 |
| WO | 2009/095336 A1 | 8/2009 |

OTHER PUBLICATIONS

ETSI TS 124 312 V8.2.0, Universal Mobile Telecommunications System (UMTS); LTE; Access Network Discovery and Selection Function (ANDSF) Management Object (MO) (3GPP TS 24.312 version 8.2.0 Release 8), Jun. 2009, 83 pages.

(Continued)

*Primary Examiner* — Steve D Agosta
(74) *Attorney, Agent, or Firm* — Squire Patton Boggs (US) LLP

(57) ABSTRACT

An operator identity for an ANDSF management object is described. The operator identity identifies the server that originally provided the data concerned to the management object. In this way, it is possible to determine the operators that are responsible for different branches of an ANDSF management object. The operator identity may take the form of a PLMN identity.

17 Claims, 8 Drawing Sheets

(56) References Cited

OTHER PUBLICATIONS

XP-002360958, Open Mobile Alliance, "OMA Device Management Tree and Description", Candidate Version 1.2—Jun. 15, 2005, pp. 1-48.

ETSI TS 131 102 V5.3.0, Universal Mobile Telecommunications System (UMTS); Characteristics of the USIM Application (3GPP TS 31.102 version 5.3.0 Release 5), Dec. 2002, 144 pages.

Research in Motion, "ANDSF—Inclusion New Leafs for Free Format Text" C1-085535, 3GPP TS 24.312, 3GPP TSG CT WG4 Meeting #41, Shanghai, People's Republic of China, Nov. 9-14, 2008, 7 pages.

3GPP TS 24.312 V8.1.0, "3rd Generation Partnership Project; Technical Specification Group Core Network and Terminals; Access Network Discovery and Selection Function (ANDSF) Management Object (MO); (Release 8)", Mar. 2009, 83 pages.

Open Mobile Alliance, "OMA Device Management Tree and Description Serialization", Approved 1.2—Feb. 9, 2007, pp. 1-19.

English translation of Chinese Office Action dated May 22, 2014, for corresponding Chinese Patent Application No. 200980162705.0.

Chinese Office Action dated Mar. 18, 2015, for corresponding Chinese Patent Appln. No. 200980162705.0.

\* cited by examiner

NETWORK SELECTION MECHANISMS

BACKGROUND OF THE INVENTION

1. Field of the Invention

The invention relates to Automatic Network Discovery and Selection Function (ANDSF) mechanisms (and the like) and to the use of ANDSF data or other network selection data.

2. Description of Related Art

Many mobile communication devices are able to make use of more than one communication access technology. For example, some mobile communication devices are able to make use of both the 3GPP standard and WLAN (wireless local area network).

Providing a mobile communication device with alternative communication technologies has a number of potential advantages. For example, the mobile communication device may be able to function in areas where only one of a number of access technologies is available. Also, if a user requires a low cost connection, then the cheapest of a number of available connection options can be chosen. Alternatively, if a user wants to send a large amount of data over a connection, then a connection with a high available bandwidth can be chosen.

It is known to provide mobile communication devices with information regarding access technologies that are available. Access Network Discovery and Selection Function (ANDSF) mechanisms allow a mobile operator to provide subscriber devices with inter-system mobility policies for automatic, intelligent network selection in a heterogeneous network environment, where a plurality of different non-3GPP access technologies are available together with 3GPP or fulfilling gaps where 3GPP is not available.

FIG. 1 is a block diagram of a system, indicated generally by the reference numeral 1, comprising a mobile communication device 2, an ANDSF server 4, a first mobile network 6 and a second mobile network 8.

In the use of the system 1, the ANDSF server 4 provides information to the mobile communication device 2 regarding the priority in which the access networks available to the mobile device (such as the networks 6 and 8) should be accessed. The mobile communication device requests this priority information from the ANDSF server 4, and the ANDSF server returns the requested data to the mobile communication device. The mobile communication device 2 may choose the network to be used with ANDSF communication according to existing network selection information or by any other means available to the mobile device.

FIG. 2 is a flow chart showing an algorithm, indicated generally by the reference numeral 10, showing an exemplary use of the system 1 by the mobile communication device 2.

The algorithm 10 starts at step 12, where ANDSF information is obtained. The ANDSF information may, for example, be provided (by the ANDSF server 4) on request from the mobile communication device 2 (in a "pull" mode) or may be provided in a manner determined and initiated by the ANDSF server (in a "push" mode).

The ANDSF server 4 provides a number of policies for connecting the mobile communication device 2 to networks (such as the first mobile network 6 or the second mobile network 8). Priorities are assigned to the various policies and, at step 14 of the algorithm 10, the highest priority valid policy is applied by the mobile communication device 2. A policy is considered to be "valid" if it meets a number of validity conditions. Such conditions may, for example, relate to location or the time of day.

The policy selected at step 14 will have a number of access network options associated with it. The access network options will be prioritized within the policy. At step 16 of the algorithm 10, the highest priority access network option of the selected policy is selected at the mobile communication device 2.

The algorithm 10 moves to step 18 where it is determined whether or not the highest priority access network option of the selected policy has resulted in a successful connection to an available network. If a network connection has been made, then the algorithm 10 terminates at step 24. If a connection has not been made then the algorithm 10 moves to step 20, where it is determined whether or not the selected policy has any more (lower priority) access network options available.

It should be noted that ANDSF information does not define when a network connection is considered to be good enough. Even if a mobile communication device is able to connect to a network, the network quality may still be low. It is left to the mobile communication device to decide whether a given network fulfills its own requirements for the connection. If the network quality is too low, then the mobile communication device can choose the next preferred network in the policy.

If no further access network options exist, the algorithm 10 terminates at step 24. If further access network options do exist, then the next highest priority access network is selected at step 22. The algorithm 10 then returns to step 18, where it is determined whether or not the newly selected access network results in a successful connection to an available network. If a connection is made, then the algorithm 10 terminates at step 24. If a connection is not made, then the algorithm 10 moves to step 20, as discussed above.

The algorithm 10 continues until either a successful connection is made or all access network options of the selected policy have been tried. In some implementations of ANDSF systems, if the highest priority valid policy does not result in a connection being made, then no further efforts are made to make a connection. In other implementations, if the highest priority valid policy does not result in a connection being made, then the next highest priority policy (if any) is used and steps 16 to 24 of the algorithm 10 are repeated using that policy.

In addition to providing network selection policies, ANDSF allows mobile operators to provide access network discovery information (ANDI) to assist user equipment (UE) in detecting access networks specified in the ANDSF policy rules. Policies are used to list preferred access networks in any given location or time.

Discovery information consists of radio technology specific information like frequencies and channels. This is particularly important, for example, for WiMAX where blind scanning of the whole frequency domain can take a considerable period of time (perhaps as much as 15 minutes or more) and can use considerable battery resources.

Both policies and discovery information can have validity area, expressed for example using 3GPP Cell Identifier or tracking area data. Typically, an ANDSF server runs in an operator network and delivers the policies and discovery information to a user device either on request from the user device (pull mode) or at the operator's preference (push mode).

When the ANDSF mechanism was first proposed, it was only intended to provide data that is valid within the area of a single public land mobile network (PLMN). This network (the "home" network) of the user device was the only network for which ANDSF data was provided. More recently, it has been proposed to provide roaming support using ANDSF data. This means that when a particular user device moves from a home network to a visited network, the user device can still make use of ANDSF information. In one arrangement, when roaming, a user device is able to contact a home operator ANDSF (H-ANDSF), a visited operator ANDSF (V-ANDSF) or both.

FIG. 6 is a block diagram of a system, indicated generally by the reference numeral 60, comprising a mobile communication device 62, a visited operator ANDSF (V-ANDSF) 64, a home operator ANDSF (H-ANDSF) 65 and a network 66 (such as a 3GPP IP access network or some other non-3GPP IP access network). As shown in FIG. 6, the mobile communication device 62 and the V-ANDSF server 64 are located within a VPLMN and the H-ANDSF server 65 is located within a HPLMN. The HPLMN and VPLMN are separated in FIG. 6 by a dotted line 68. Accordingly, in the system 60, the mobile communication device 62 is roaming in the network VPLMN and using the network 66 of the VPLMN to do so.

BRIEF SUMMARY OF THE INVENTION

When the mobile communication device 62 is in its home network (i.e. served by the HPLMN), then the device 62 should only use ANDSF information provided by the H-ANDSF server 65. When the device 62 is roaming, as in the system 60, the device 62 should use either ANDSF information provided by the relevant V-ANDSF server (i.e. the server 64) or the H-ANDSF server 65. The mobile communication device should not use ANDSF information obtained from any other source. However, it is not currently clear how this requirement should be achieved, as discussed further below.

It should be noted that 3GPP specifications require that each PLMN can specify its own policy rules which are to be followed while a user device is roaming in the PLMN. Only a home PLMN can specify rules for other PLMNs and these are followed if the current PLMN does not provide its own rules.

The inventors have realised that although the ability of a user device to make use of ANDSF information when roaming is convenient, it can lead to complications.

With the introduction of roaming support, ANDSF information stored at a particular user device may be edited by a number of different ANDSF servers (i.e. by the H-ANDSF for the device, and by one or more V-ANDSF servers). There is currently no practical mechanism to prevent a first ANDSF server from modifying ANDSF data that has been provisioned by a second ANDSF server. Since a particular set of ANDSF policies is controlled by a single ANDSF server, it is not generally desirable for such policies to be edited by different ANDSF servers. Indeed, ANDSF data stored at a user device that has been modified by the wrong ANDSF server may, in severe cases, be useless.

Accordingly, there remains a need to address the problem of multiple ANDSF servers being able to modify multiple sources of ANDSF data. The Open Mobile Alliance (OMA) device management (DM) process provides a mechanism for management objects (such as ANDSF MOs) to define restrictions that can be used to limit which OMA DM servers may edit information stored on a particular user device. However, since ANDSF information from different servers is generally stored under the same ANDSF management object (MO) tree, all of the relevant ANDSF servers require permission to modify the relevant part of the tree and so this form of access restriction is not appropriate.

A further problem is that having different ANDSF servers operating on the same ANDSF MO results in it becoming complicated for ANDSF servers to pinpoint data that needs to be updated in the MO and for user devices to find relevant policy and discovery information related to the user device's current location and serving operator in the MO. This complicates the operation of the user devices and also leads to longer management sessions as the ANDSF server has to determine what other servers have been doing in the MO before it can make further modifications. Due to the nature of the OMA DM protocol used in the management operations, this time can easily differ in magnitude of tens of seconds. It is highly inefficient and can be expensive in terms of wasted battery resources at the user devices, wasted network resources and wasted ANDSF server resources.

The present invention seeks to address at least some of the problems outlined above.

In the use of ANDSF information, user devices should only use ANDSF information provided either by the HPLMN operator or by the VPLMN operator where the user is currently roaming. This is not evident from current MO structure. The present invention proposes a variety of alternative management object structures that enables a user device to determine the identity of the operator that provided the ANDSF information in a particular portion of an ANDSF MO tree.

The present invention seeks to provide one or more of the following advantages:

1. Enabling the user device to detect legitimate candidate policies and/or discovery information (for example, based on PLMN_ID being equal to the current PLMN in which the user device is located).
2. Controlling the server access to the ANDSF MO, e.g. for preventing misuse by ANDSF servers.
3. Enabling an ANDSF server to be aware of what information within an ANDSF MO tree it should modify. Servers do not need to consider any settings from other servers (e.g. naming collisions, policy priority considerations etc.)

In accordance with an aspect of the present invention, there is provided a method of controlling editing mobile telecommunications network selection data (such as automatic network discovery and selection function data) stored at a user device, the method comprising: checking an operator identity associated with the network selection data that is intended to be edited, wherein the operator identity identifies an original provider of the said network selection data; and allowing said network selection data to be edited in the event that an entity attempting to edit the data is the original provider of the data.

In accordance with an aspect of the invention, there is provided a server (such as an automatic network discovery and selection function server) comprising: a first input for obtaining an operator identity (such as a PLMN identity) associated with data stored at a data structure (e.g. an ANDSF MO) that the server intends to edit; and a first processor for allowing the server to edit said data only if said operator identity identifies the said server.

In accordance with an aspect of the invention, there is provided a mobile communication device (or some other user device) comprising: a first processor for checking an operator identity associated with network selection data (such as automatic network discovery and selection function data) stored at the user device that is intended to be edited, wherein the operator identity identifies an original provider of the said network selection data; and a second processor for allowing said network selection data to be edited in the event that an entity attempting to edit the data is the original provider of the data.

The steps of the invention may be carried out by an entity (e.g. a server, such as an ANDSF server) seeking to edit the said network selection data. Alternatively, the steps of the invention may be carried out by the user device (e.g. a mobile communication device).

In one form of the invention, the editing of the network selection data is sought by an automatic network discovery and selection function (ANDSF) server. Thus, the entity attempting to edit the data may be a mobile operator seeking to set (or amend) ANDSF policies for a particular subscriber device.

In some forms of the invention, the network selection data is stored at the user device in a data structure (such as a management object, typically an ANDSF MO).

The operator identity may be stored by specifying a naming format of one or more nodes or leaves of said data structure. Alternatively, the operator identity may be stored as a property of a node of the data structure (typically an automatic network discovery and selection function management object).

In some forms of the invention, the operator identity is stored at an interior node below (typically immediately below) a policy node of the data structure. The operator identity may be stored (additionally) at an interior node below a discovery information node of the ANDSF MO.

In some forms of the invention, the operator identity is stored at an interior node above (typically immediately above) a policy node (and/or a discovery information node) of the data structure.

In some forms of the invention, the operator identity is stored at a leaf below a policy node of the data structure. The operator identity may be stored (additionally) at a leaf below a discovery information node of the ANDSF MO.

In many forms of the invention, the operator identity is a public land mobile network (PLMN) identity. The PLMN identity comprises an MCC and an MNC and additionally may include a running number assigned by the ANDSF server.

In accordance with a further aspect of the present invention, there is provided a method of populating a data structure (such as a management object, typically an ANDSF MO) stored at a user device with mobile telecommunications network selection data (such as ANDSF data), the method including storing an operator identity that identifies the identity of a server (typically an ANDSF server) providing the network selection data.

The operator identity may be stored by specifying a naming format of one or more nodes or leaves of said data structure.

Alternatively, the operator identity may be stored as a property of a node of the data structure (typically an automatic network discovery and selection function management object).

In some forms of the invention, the operator identity is stored at an interior node below (typically immediately below) a policy node of the data structure. The operator identity may be stored (additionally) at an interior node below a discovery information node of the ANDSF MO.

In some forms of the invention, the operator identity is stored at an interior node above (typically immediately above) a policy node (and/or a discovery information node) of the data structure.

In some forms of the invention, the operator identity is stored at a leaf below a policy node of the data structure. The operator identity may be stored (additionally) at a leaf below a discovery information node of the ANDSF MO.

In many forms of the invention, the operator identity is a public land mobile network (PLMN) identity. The PLMN identity comprises an MCC and an MNC and additionally may include a running number assigned by the ANDSF server.

In accordance with a further aspect of the invention, there is provided a method of controlling the use of mobile telecommunications network selection data by a user device, wherein said network selection data is stored at the user device, the method comprising: checking an operator identity associated with the network selection data, wherein the operator identity identifies an original provider of the said network selection data; and determining whether the original provider of the said network selection data is such that said user device can make use of said data.

In accordance with an aspect of the invention, there is provided a mobile communication device comprising: a first processor for checking an operator identity associated with network selection data stored at the user device, wherein the operator identity identifies an original provider of the said network selection data; and a second processor for determining whether the original provider of the said network selection data is such that said user device can make use of said data.

In one form of the invention, determining whether the original provider of said network selection data is such that said user device can make use of said data includes determining whether said original provider provides data for a home network (e.g. an H-PLMN) of the user device.

In one form of the invention, determining whether the original provider of said network selection data is such that said user device can make use of said data includes determining whether said original provider provides data for a network currently being visited (e.g. a VPLMN) by the user device.

The operator identity may be stored by specifying a naming format of one or more nodes or leaves of said data structure. Alternatively, the operator identity may be stored as a property of a node of the data structure (typically an automatic network discovery and selection function management object).

In some forms of the invention, the operator identity is stored at an interior node below (typically immediately below) a policy node of the data structure. The operator identity may be stored (additionally) at an interior node below a discovery information node of the ANDSF MO.

In some forms of the invention, the operator identity is stored at an interior node (immediately) above a policy node (and/or a discovery information node) of the data structure.

In some forms of the invention, the operator identity is stored at a leaf below a policy node of the data structure. The operator identity may be stored (additionally) at a leaf below a discovery information node of the ANDSF MO.

In many forms of the invention, the operator identity is a public land mobile network (PLMN) identity. The PLMN identity comprises an MCC and an MNC and additionally may include a running number assigned by the ANDSF server.

In accordance with an aspect of the invention, there is provided a data structure (such as management object, typically an automatic network discovery and selection function management object) comprising an operator identity identifying an originator of mobile telecommunications network selection data stored within the data structure.

The operator identity may be stored at an interior node below (typically immediately below) a policy node of the automatic network discovery and selection function management object.

The operator identity may be stored at an interior node below (typically immediately below) a discovery information node of the automatic network discovery and selection function management object.

The operator identity may be stored at an interior node above (typically immediately above) a policy node (and/or a discovery information node) of the automatic network discovery and selection function management object.

The operator identity may be stored at a leaf below a policy node of the automatic network discovery and selection function management object.

The operator identity may be stored at a leaf below a discovery information node of the automatic network discovery and selection function management object.

In many forms of the invention, the mobile telecommunications network selection data is automatic network discovery and selection function (ANDSF) data.

The operator identity may be stored by specifying a naming format of one or more nodes or leaves of said data structure.

The operator identity may be stored as a property of a node of the automatic network discovery and selection function management object.

The operator identity may be a public land mobile network (PLMN) identity. The PLMN identity comprises an MCC and an MNC and additionally may include a running number assigned by the ANDSF server.

According to an aspect of the invention, there is provided a computer program comprising: code (or some other means) for checking an operator identity associated with mobile telecommunication network selection data stored at a user device that is intended to be edited, wherein the operator identity identifies an original provider of the said network selection data; and code (or some other means) for allowing said network selection data to be edited in the event that an entity attempting to edit the data is the original provider of the data. The computer program may be a computer program product comprising a computer-readable medium bearing computer program code embodied therein for use with a computer.

According to an aspect of the invention, there is provided a computer program adapted to populate a data structure stored at a user device with mobile telecommunications network selection data, wherein the computer program product comprises code (or some other means) for storing an operator identity that identifies the identity of a server providing the network selection data. The computer program may be a computer program product comprising a computer-readable medium bearing computer program code embodied therein for use with a computer.

According to an aspect of the invention, there is provided a computer program comprising: code (or some other means) for checking an operator identity associated with mobile communication network selection data stored at a user device, wherein the operator identity identifies an original provider of the said network selection data; and code (or some other means) for determining whether the original provider of the said network selection data is such that said user device can make use of said data. The computer program may be a computer program product comprising a computer-readable medium bearing computer program code embodied therein for use with a computer.

BRIEF DESCRIPTION OF THE SEVERAL VIEWS OF THE DRAWINGS

Exemplary embodiments of the invention are described below, by way of example only, with reference to the following numbered drawings.

DETAILED DESCRIPTION OF THE INVENTION

Figure 1:
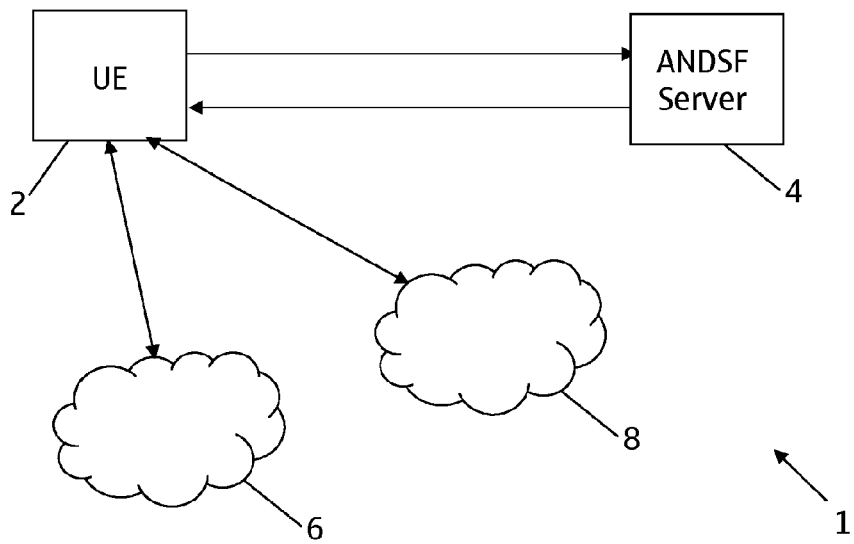
FIG. 1 is a block diagram of a system in which the present invention may be used.
Figure 6:
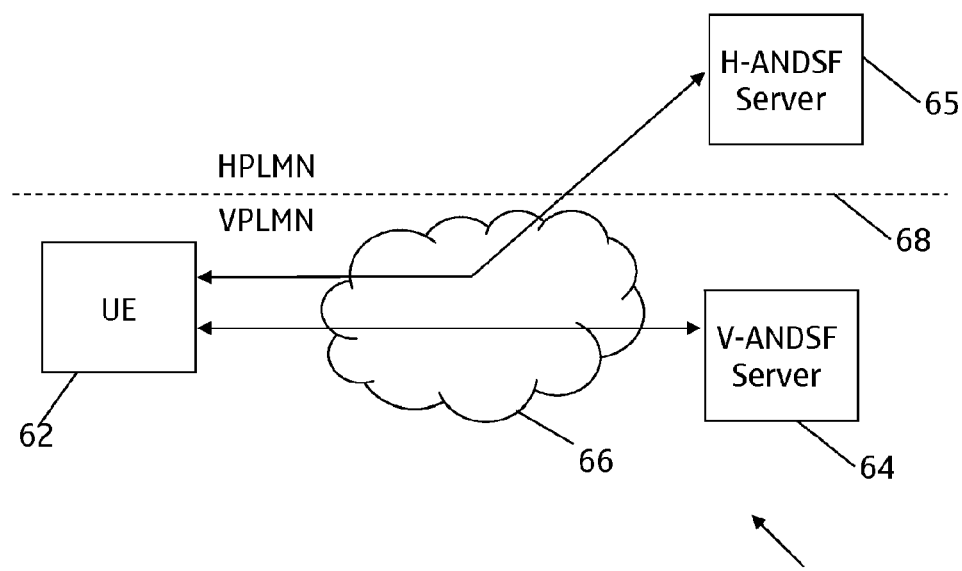
FIG. 6 is a block diagram showing a system in which the present invention may be used.
Figure 2:
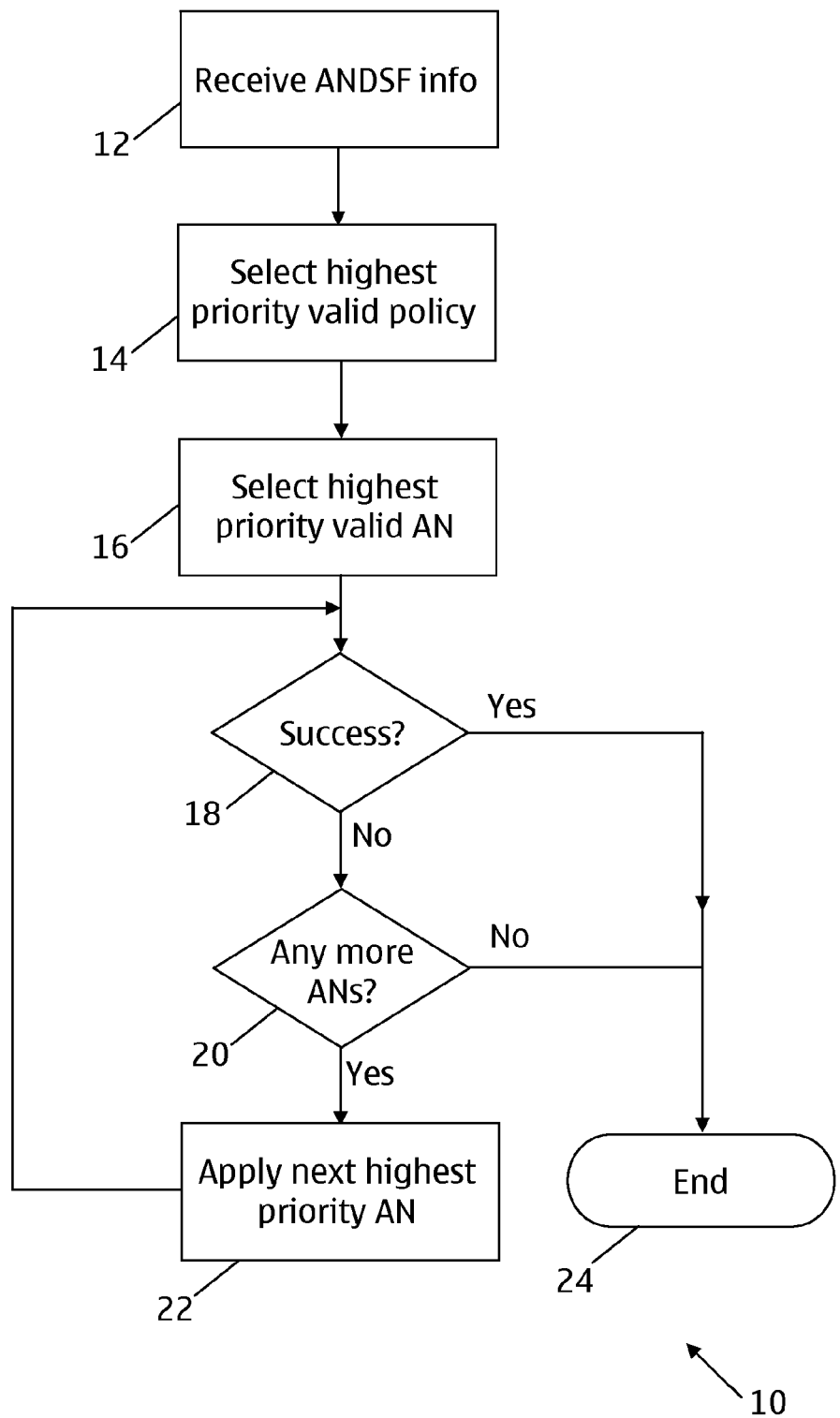
FIG. 2 is a flow chart showing a network access selection algorithm.
Figure 3:
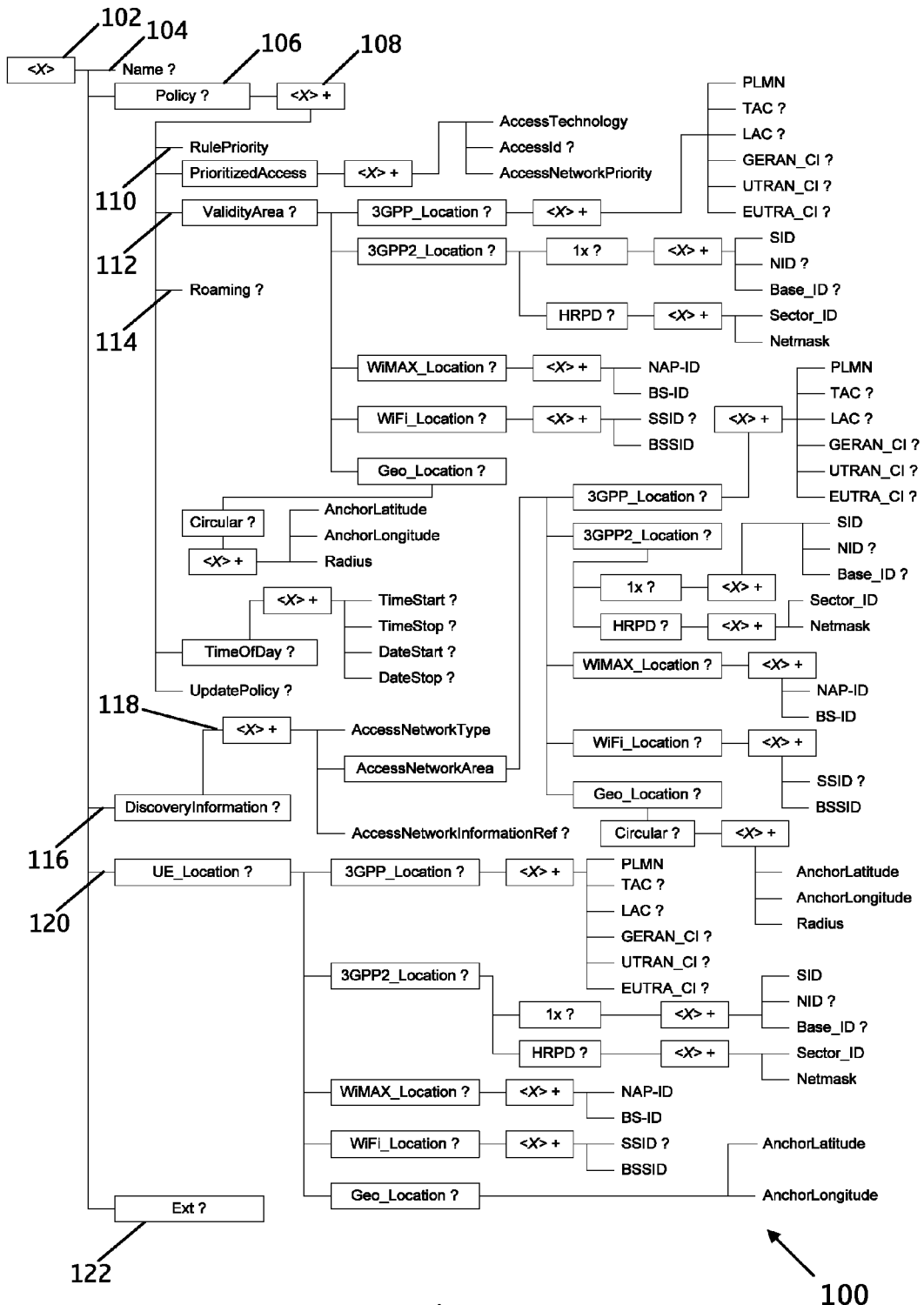
FIG. 3 is a block diagram showing an exemplary ANDSF management object structure in accordance with an aspect of the present invention.

FIG. 3 is a block diagram showing an exemplary ANDSF management object structure, indicated generally by the reference numeral 100, in accordance with an aspect of the present invention. The structure of the management object 100 is the same as that set out in the technical specification 3GPP TS 24.312 V 8.1.0 produced by the 3rd Generation Partnership Project (available at www.3gpp.org). The management object 100 is supplied to a user device (such as the user device 2) by an ANDSF server (such as the ANDSF server 4). As policies and rules are changed, the ANDSF server may update the data stored at the user device.

The management object 100 is a tree of leaves and nodes. The tree starts at an interior node 102 (the root of the tree), which provides a placeholder, under which an account for a fixed node may be provided. As shown in FIG. 3, a number of nodes and leaves are provided under the node 102, some (but not all) of which are discussed below.

A Name leaf 104, a Policy node 106, a DiscoveryInformation node 116, a UE_Location node 120 and an Ext node 122 are provided under the node 102, i.e. at the next level of the tree 100.

The name leaf 104 enables a name to be stored. The name stored at the name leaf 104 is not the formal name of the ANDSF MO. The name of the ANDSF MO is given at node 102. The name stored at the leaf 104 is a string and is generally the name that is shown to the user in any user interface associated with the tree 100.

The policy node 106 acts as a placeholder for policies for intersystem mobility. An interior node 108 is located under the policy node 106. Policies are stored under the node 106, with one policy being stored within each node 108. The ANDSF MO 100 shown in FIG. 3 (and the other ANDSF MOs described in this document) follows the OMA DM syntax for Management Objects, such that the symbol '+' after a node or leaf name (as with the node 108) indicates that one or more instances of the node or leaf may be present in any particular ANDSF MO.

As shown in the algorithm 10 discussed above, the highest priority valid policy may be selected when a user is attempting to connect to a network. The data stored at and under the policy node 106 can, amongst other functions, be used to determine the validity and priority of policies.

The DiscoveryInformation node 116 acts as a root node for access network discovery information. As discussed above, access network discovery information (ANDI) can be used by a user device in detecting access networks specified in ANDSF policy rules. The access network discovery information is stored with the ANDSF MO tree 100 at and below the DiscoveryInformation node 116.

The UE_Location node 120 acts as a placeholder for data describing the current location of a user device. A range of location information is stored at nodes and leaves under the node 120, as shown in FIG. 3, but not discussed further here.

The Ext node 122 is an interior node where vendor-specific information about the ANDSF MO is placed. Usually the vendor extension is identified by a vendor-specific name under the Ext node. The tree structure under the vendor identifier may take many forms and is neither shown in FIG. 3, nor discussed further here.

As discussed above, the policy node 106 acts as a placeholder for policies for intersystem mobility, with the policies themselves being stored within the interior node 108. As described in the algorithm 10 discussed above, the highest priority valid policy (valid according to validity conditions) is considered for network selection. The user device connects to the most preferred access network in the prioritized access list which user device is able to detect.

The rule structure shown in FIG. 3 includes a rule priority leaf 110, a ValidityArea node 112 and a Roaming leaf 114. Other nodes and leaves are shown in FIG. 3, but are not discussed further here.

The RulePriority leaf 110 represents the priority given to one particular rule and is represented as a numerical value.

The ValidityArea node 112 acts as a placeholder for location conditions for a particular rule. A range of area information is stored at nodes under the node 112, as shown in FIG. 3, but not discussed further here.

The Roaming leaf 114 indicates the roaming condition for the intersystem mobility policy rule. The rule is not valid unless the current user device roaming status (indicating whether or not the user device is roaming) matches the value in this field. VPLMN ANDSF would need to set this field always to 'roaming' while HPLMN ANDSF could set it either to 'roaming' or 'not roaming'. It is entirely possible that in some implementations of the ANDSF MO, this feature may be implemented differently.

As discussed above, the DiscoveryInformation node 116 acts as a placeholder for access network discovery information. An interior node 118 is located under the DiscoveryInformation node 116 and acts as a placeholder for one or more access network information elements. A range of discovery data is stored at nodes and leaves under the node 118, as shown in FIG. 3, but not discussed further here.

3GPP specifications require that each PLMN can specify its own policy rules which are to be followed while a user device is roaming in the PLMN. Only a home PLMN can specify rules for other PLMNs and these are followed if the current PLMN does not provide its own rules. Thus, a user device must be able to detect which rules are created by which PLMN. This is not properly reflected in the existing ANDSF MO as only the ACL (Access Control List) property of the ANDSF MO node or its child nodes can store information about the creator of the node. Even if this property were set by the ANDSF server, a user device has no means to map the value to any specific PLMN as the value format is not defined. In OMA DM, the ACL is used to define which servers (by server name) are allowed to read/modify/delete the node or create new nodes under it.

The structure of the management object 100 shown in FIG. 3 can be exploited to store an operator identity for an ANDSF management object (MO) for use in identifying the ANDSF server that initially added the ANDSF data to the ANDSF MO tree at the user device concerned.

In a first embodiment of the invention, an operator identity is stored at the interior nodes 108 and 118 (i.e. below the policy node 106 and the DiscoveryInformation node 116 in the tree 100). As discussed above, the node 108 (and the leaves and nodes below it) is repeated for each policy. Accordingly, each version of the node 108 includes an operator identity that can be used to identify the ANDSF server that originally populated the policy with data. Similarly, the node 118 is repeated. If an operator identity is provided for each instance of the node 118 (which is not essential to all embodiments of the invention), then the originator of the discovery information provided by each instance of the node 118 can readily be determined.

Thus, by specifying a specific naming format to identify the operator that provided the data included in the relevant portion of the tree, it is possible for the user device and for an ANDSF server to identify the ANDSF server that originally provided the data concerned to the ANDSF MO tree. Thus, when an ANDSF server (such as the server 4 described above) is seeking to modify ANDSF data stored at a user device, it is possible to determine whether or not that ANDSF server originally provided the data that is to be modified. If not, the ANDSF server may simply determine that it should not edit the data. Alternatively, a mechanism may be provided to prevent that ANDSF server from editing the data.

It should be noted that there is no requirement that policy and discovery information are related. Having the operator identity visible in the discovery information allows user devices to limit considerations for specific operator-provided information, but does not necessarily require it to do so. Thus, for policy data the consideration of operator identity may be mandatory, but for discovery information the consideration of operator identity may not be mandatory.

The operator identity could take many different forms. By way of example, the operator identity could be a public land mobile network (PLMN) identity that includes a mobile country code (MCC) and a mobile network code (MNC, which is an operator-specific identifier within the MCC). For example, an exemplary operator identity might be: 24405_001, where:
1. "244" is the mobile country code (MCC) for Finland;
2. "05" is the mobile network code (MNC) for Elisa (a Finnish telecommunications company); and
3. "001" is a running number assigned by the ANDSF server.

In the number format above, "24405" is the PLMN identifier and "001" is a running number. This format may be advantageous since each instance of an interior node or leaf in the ANDSF MO tree should have a distinct name. Providing a running number is a simple method of achieving this, but is not essential to all embodiments of the invention.

Of course, other forms of operator identity could be used instead of a PLMN identity. Nevertheless, since user devices must understand which rules to consider and user devices should consider only those rules provided by the current PLMN or the home PLMN, the use of a PLMN identifier may well often be the most convenient solution.

As discussed above with reference to FIG. 3, the management object 100 in accordance with an aspect of the present invention exploits the structure of the known ANDSF MO and stores operator information in a pre-defined format (e.g. as a PLMN identity). This is not essential to all embodiments of the invention. As discussed further below, the structure of the ANDSF MO may be modified to incorporate the operator information in a different way.

Figure 4:
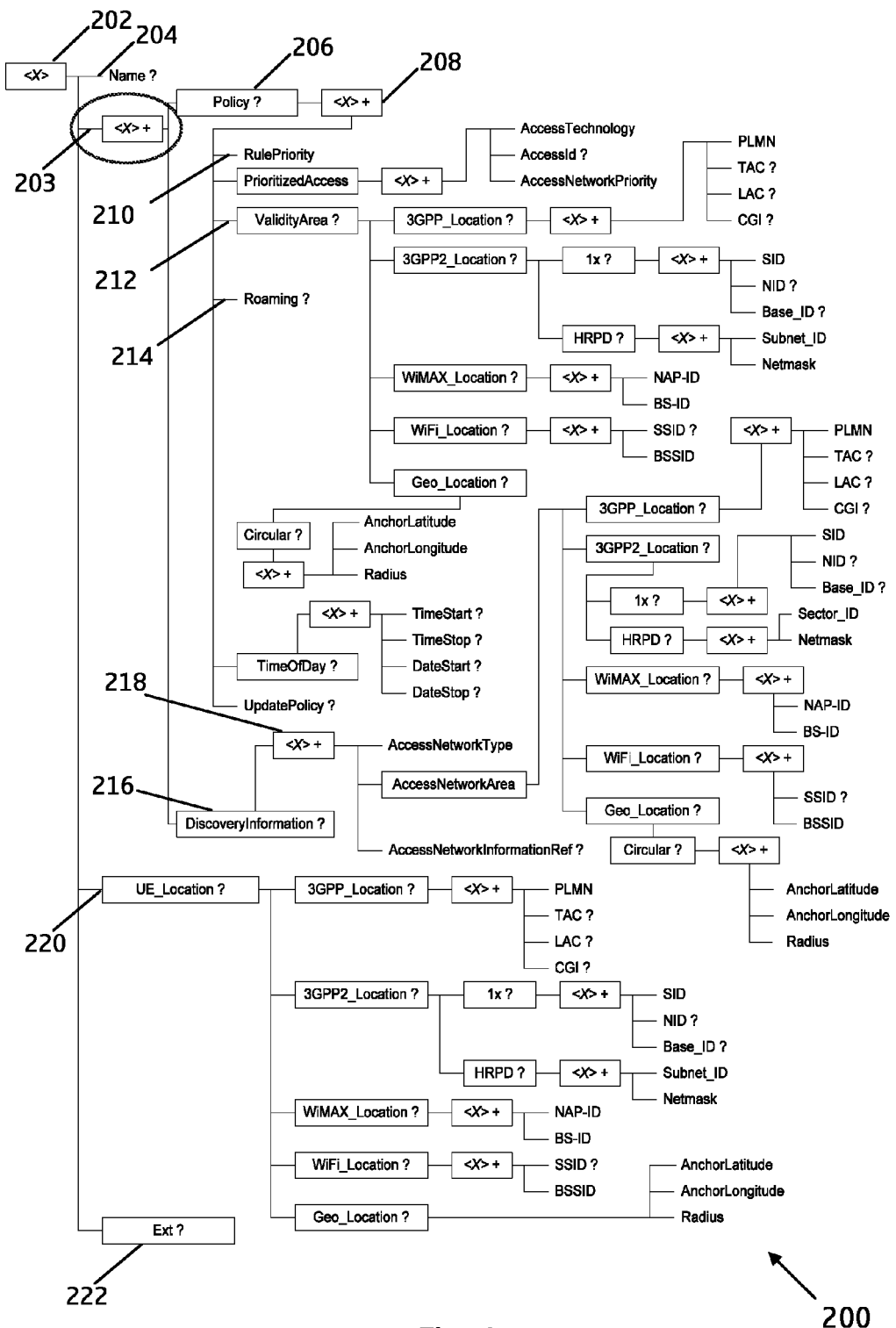
FIG. 4 is a block diagram showing an exemplary ANDSF management object structure in accordance with an aspect of the present invention.

FIG. 4 shows a management object 200 that is similar to the management object 100 described above. The management object 200 has its root at an interior node 202, which is similar to the interior node 102 of the management object 100. The management object 200 also includes a Name leaf 204, a Policy node 206, a DiscoveryInformation node 216, a UE_location node 220 and an Ext node 222 that are similar to the Name leaf 104, Policy node 106, DiscoveryInformation node 116, UE_location node 120 and Ext node 122 described above respectively.

In a similar manner to the management object 100, the Name leaf 204, the UE_location node 220 and the Ext node 222 are all located below the interior node 202 of the tree 200. However, unlike the management object 100, the policy node 206 and DiscoveryInformation node 216 are separated from the interior node 202 by an interior node 203, which interior node is discussed further below.

The policy node 206 acts as a placeholder for policies for intersystem mobility. As described above, multiple policies could be stored under the node 203. An interior node 208 is located under the policy node 206. The interior node 208 acts as a placeholder for one or more intersystem mobility policy rules. As discussed above, multiple rules for any particular policy could be stored. The rule shown in FIG. 4 includes a rule priority leaf 210 (similar to the rule priority leaf 110), ValidityArea node 212 (similar to the ValidityArea node 112) and Roaming leaf 214 (similar to the Roaming leaf 114). Other nodes and leaves are shown in FIG. 4, but, as with the management object 100 described above, are not discussed further here.

The DiscoveryInformation node 216 acts as a placeholder for access network discovery information. An interior node 218 is located under the DiscoveryInformation node 216 and acts as a placeholder for one or more access network information elements. A range of discovery data is stored at nodes and leaves under the node 218, as shown in FIG. 4, but not discussed further here.

The interior node 203 stores the operator identity for the ANDSF server that originally provided the data stored in the relevant portion of the management object 200. As described above with reference to the management object 100, the operator identity may take the form of a PLMN identity including, for example, a mobile country code (MCC), mobile network code (MNC) and possibly also a running number assigned by the ANDSF server concerned. As noted above, the use of a PLMN identity as the operator identity is not essential to all embodiments of the present invention.

The use of the "+" symbol in FIG. 4 indicates that there may be multiple instances of the node 203. Each instance of the node 203 includes an operator identifier that can be used to identify the ANDSF server that originally provided the policy and discovery information stored below that instance of the node 203.

Thus, the management object 200 differs from the management object 100 in the provision of the interior node 203, which node stores the operator identity discussed above. Accordingly, the interior nodes 208 and 218 differ from the interior nodes 108 and 118, in that the nodes 208 and 218 do not store the relevant operator identity (or at least do not need to do so for the purposes of the present invention).

The management object 200 has the advantage that the operator identity is more easily found by an ANDSF server seeking to update the MO 200, or by a user device seeking to use the ANDSF data, since the operator identity is stored in a single place, close to the root of the tree. When, for example, a mobile communication device seeks to find candidate policy and/or discovery information for a particular PLMN, each instance of the node 203 (which is close to the root of the ANDSF MO 200) can be checked to see if it was provided by the ANDSF server for that PLMN. The principal disadvantage of the structure of the management object 200 is that it is not compatible with release 8 of the relevant 3GPP standard.

Figure 5:
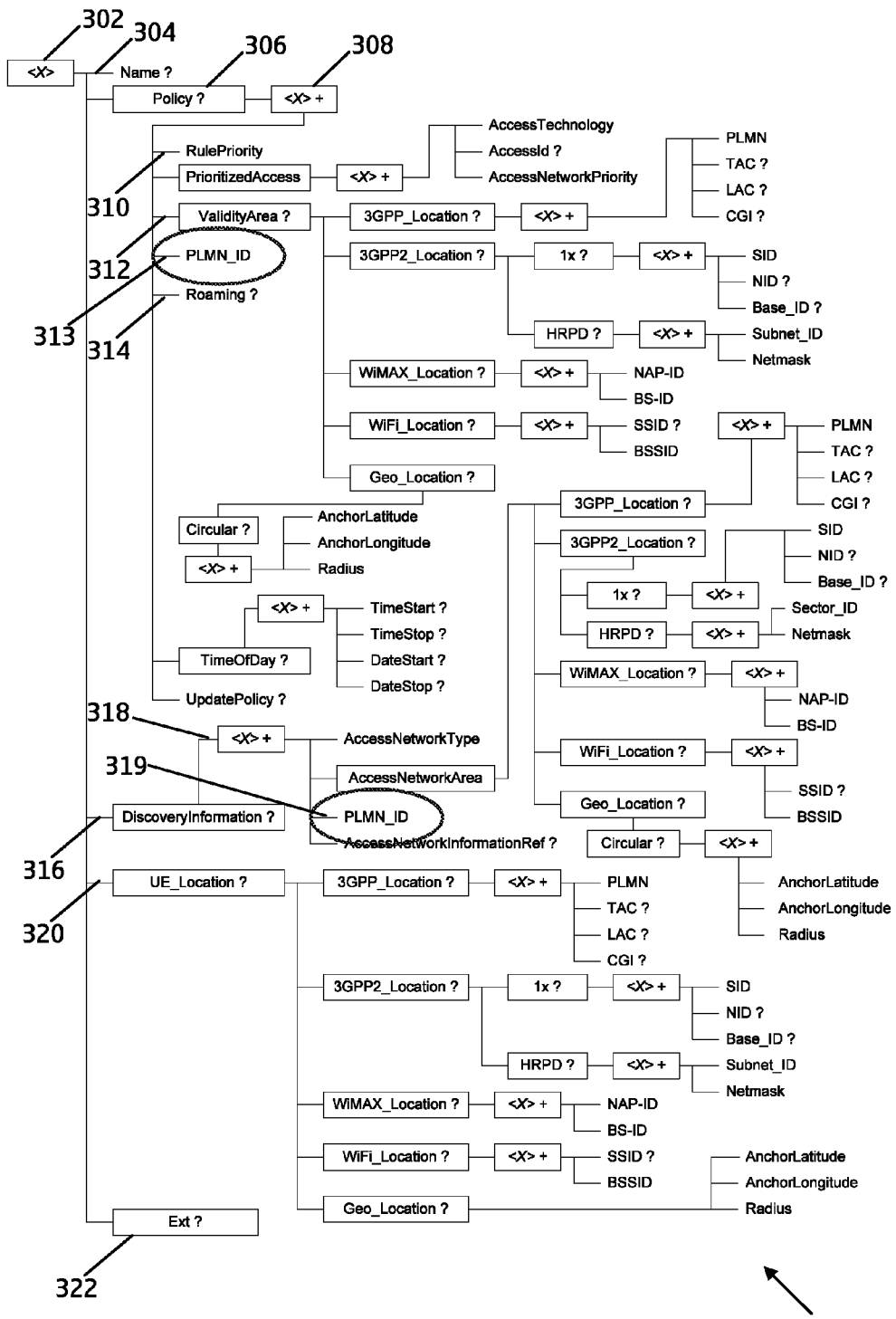
FIG. 5 is a block diagram showing an exemplary ANDSF management object structure in accordance with an aspect of the present invention.

FIG. 5 shows a management object 300 that is similar to the management objects 100 and 200 described above. The management object 300 has its root at an interior node 302, which is similar to the interior nodes 102 and 202. The management object 300 also includes a name leaf 304, a Policy node 306, a DiscoveryInformation node 316, a UE_location node 320 and an Ext node 322 similar to the corresponding nodes described above.

In the same manner as the management object 100, the name leaf 304, Policy node 306, DiscoveryInformation node 316, the UE_location node 320 and the Ext node 322 are all located below the interior node 302 of the tree 300.

The policy node 306 acts as a placeholder for policies for intersystem mobility. An interior node 308 is located under the policy node 306. The interior node 308 acts as a placeholder for one or more intersystem mobility policy rules. The rule structure shown in FIG. 5 includes a rule priority leaf 310, ValidityArea node 312 and Roaming leaf 314, similar to the corresponding nodes and leaves of the management objects 100 and 200. The rule additionally includes a PLMN_ID leaf 313. Other nodes and leaves are shown in FIG. 5, but, as with the management objects 100 and 200 described above, are not discussed further here.

The DiscoveryInformation node 316 acts as a placeholder for access network discovery information. An interior node 318 is located under the DiscoveryInformation node 316 and acts as a placeholder for one or more access network information elements. A range of discovery data is stored at nodes and leaves under the node 318, as shown in FIG. 5, but not discussed further here. In addition to the nodes and leaves under the node 318 that are similar to nodes and leaves of the management objects 100 and 200, the management object 300 additionally includes a PLMN_ID leaf 319 under the interior node 318.

In a similar manner to the nodes 108, 118 and 203 described above, the PLMN_ID leaves 313 and 319 store the operator identity for the ANDSF server that originally provided the data stored in the relevant portion of the management object 300. As described above with reference to the management objects 100 and 200, the operator identity may take the form of a PLMN identity including, for example, a mobile country code (MCC), mobile network code (MNC) and possibly also a running number assigned by the ANDSF server concerned, although the use of a PLMN identity is not essential to all forms of the invention. Furthermore, in a similar manner to the embodiments described above, the PLMN_ID leaf 313 may, in some cases be mandatory, whilst the PLMN_ID leaf 319 may, in some cases, be optional.

The management object 300 has similar advantages and disadvantages to the management object 100. Namely, the management object 100 has the advantage that it is compatible with release 8 of the relevant 3GPP standard, but has the disadvantage (compared with management object 200) that the operator identity needs to be searched for. Such searching can be difficult for the user device, since the user device needs to build an internal map similar to the management object 300 to easily find those policies that should be considered in each case. There are no naming rules for node 308. If different ANDSF servers create nodes 308 using similar naming rules, collisions could happen and this would make management sessions longer. If each PLMN is in own tree, it is simple operation to delete one PLMN from the ANDSF MO as only the PLMN root entry needs to be deleted. User devices may decide to delete some PLMNs if memory runs out of the ANDSF application.

The various embodiments of the invention described above each make use of a management object to store operator identity information. One way in which this can be achieved is to make use of existing node property functionality.

The use of properties is described in Open Mobile Alliance (OMA) Device Management (DM) documentation (see, for example, "OMA Device Management Tree and Description. Approved version 1.2", dated 9 Feb. 2007 and available from www.openmobilealliance.org).

When a node of a tree is created, an ACL (Access Control List) property is associated with it. The ACL property is either inherited from the parent node or it is explicitly set for the node by the creator of the node. One option for storing an operator identity (such as a PLMN identity) is to use the operator identity as part of the server name and then use this name as the only server identifier for the ADD ACL property. A user device (or a second ANDSF server) could read the ADD ACL property of the node and consider the node to be created by the PLMN found in the property.

Another option could also be to create separate map table MO for 3GPP Release. The existing 3GPP release 8 tree would not be changed. Additionally a new map tree could be created to indicate, which ANDSF tree entries belong to each PLMN, as follows:

```
<ANDSF_PLMN_MAP>/<x*>/refPolicies/<y*>/refPolicy
<ANDSF_PLMN_MAP>/<x*>/refANDIs/<z*>/refANDIPath,
```

Where <x> is PLMN identifier and <y>,<z> denote each policy and discovery information created by the PLMN.

Figure 7:
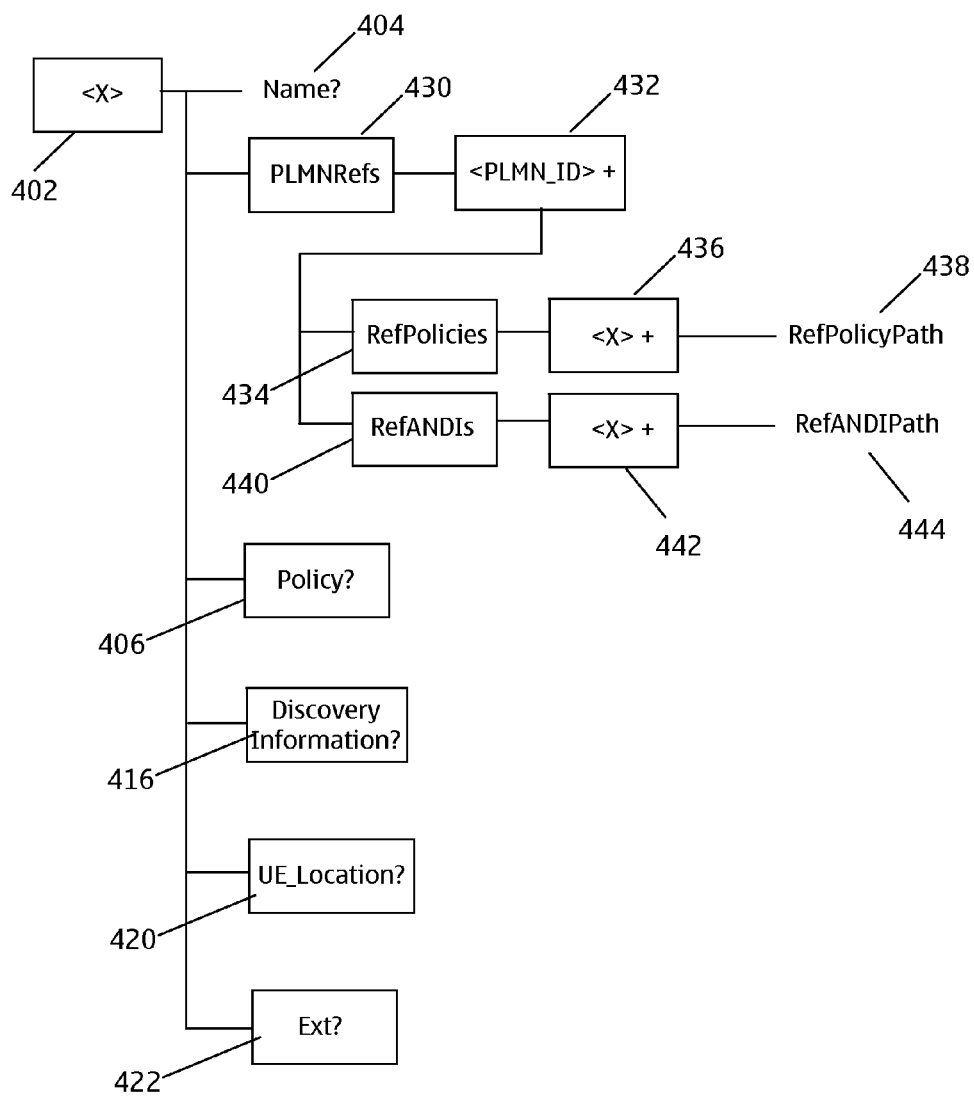
FIG. 7 is a block diagram showing part of an exemplary ANDSF management object structure in accordance with an aspect of the present invention.

As an example, FIG. 7 shows a part of a management object, indicated generally by the reference numeral 400, in accordance with an aspect of the present invention.

The management object 400 has its root at an interior node 402, which is similar to the interior nodes 102, 202 and 302. The management object 400 also includes a name leaf 404, a Policy node 406, a DiscoveryInformation node 416, a UE_location node 420 and an Ext node 422 similar to the corresponding nodes described above.

In the same manner as the management object 100, the name leaf 404, Policy node 406, DiscoveryInformation node 416, the UE_location node 420 and the Ext node 422 are all located below the interior node 302 of the tree 300. Those nodes and leaves also have a variety of information stored under them, as discussed elsewhere and not shown in FIG. 7.

In addition, the management object 400 includes a PLMNRef node 430 located below the interior node 402. The PLMNRef node stores below it a map indicating which ANDSF tree entries belong to which PLMN. Thus, below the PLMNRef node is a PLMN_ID node 432. One PLMN_ID node 432 is provided for each PLMN_ID relevant to the management object 400. The nodes 432 store an operator identity for the ANDSF server, and, under each PLMN_ID is stored a list of the policies and discovery data relevant to that PLMN_ID.

A RefPolicies node 434 and a RefANDIs node 440 are located below PLMN_ID node 432. The RefPolicies Node 434 is an internal node to hold subsequent policy nodes (node 436), one for each policy (instance of nodes 108, 208 and 308) provided by the PLMN identified in the node 432. A RefPolicyPath node 438 is provided below the node 436 and contains the ANDSF MO path to such instances of node 108, 208 and 308. By reading the value of node 438, a user device can find an actual policy in the ANDSF MO tree 402. There is one to one mapping between the nodes 438 and policy nodes 108/208/308. Node RefANDIs node 440 and the nodes below it (node 442 and RefANDIPath node 444) do the same for discovery information.

The management object 400 makes use of the structure of the existing ANDSF management object, but additionally includes further information provided under the PLMNRefs node 430. Thus, the management object 400 would be backward compatible with 3GPP release compliant management objects.

The embodiments of the invention discussed above propose adding information enabling the identity of the PLMN that added data to a portion of a tree to be identified. The data structure 100 proposes modifying the node 108 to include the PLMN identity. The data structure 200 proposes adding a new node 203 between the root 202 of the tree 200 and the policy node 206 and the DiscoveryInformation node 216. The data structure 300 proposes adding a new leaf entry "PLMN_ID" as part of the definition of a particular rule. Finally, the data structure 400 proposes creating a separate store of PLMN identity information within the MO tree. Data identifying the relevant operator could, of course, be added in other places. For example, a new node could be provided between the nodes 106 and 108 to provide an operator identifier. The skilled person would be able to identify other locations within the management object tree where such data could be stored. In essence, the precise location of the operator identity does not matter to the broadest definitions of the invention: what is important is that data enabling the operator to be identified is provided within the data structure and entities (such as the user device and the relevant servers, such as ANDSF servers) can find that information in order to identify the operator that created a particular rule.

The present invention enables a user mobile communication device to detect legitimate candidate policies and discovery information based on a stored operator identity of an ANDSF server that originally provided the data. In addition, the present invention can be used to enable the user mobile communication device to control the server access to the ANDSF MO and prevent misuse by ANDSF servers. For example, if an ANDSF server with PLMN identity 58871 is attempting to write to an ANDSF MO stored at a user device, then that ANDSF server should write to a portion of the tree having that operator identity. However, the ANDSF server could potentially try to create entry using the PLMN identity 24407, if such an entry is not already created. This could block access from the real ANDSF server having the PLMN identity 24407 from being able to write to the ANDSF MO. The present invention may therefore enable a mobile communication device to check the PLMN identity of an ANDSF server before allowing it to create or modify any entry of the ANDSF MO stored at the mobile communication device. In order to do so, the mobile communication device needs to be able to decline to the ANDSF MO if an ANDSF server tries to access/create a branch of the ANDSF MO that does not have a matching PLMN identity.

Figure 8:
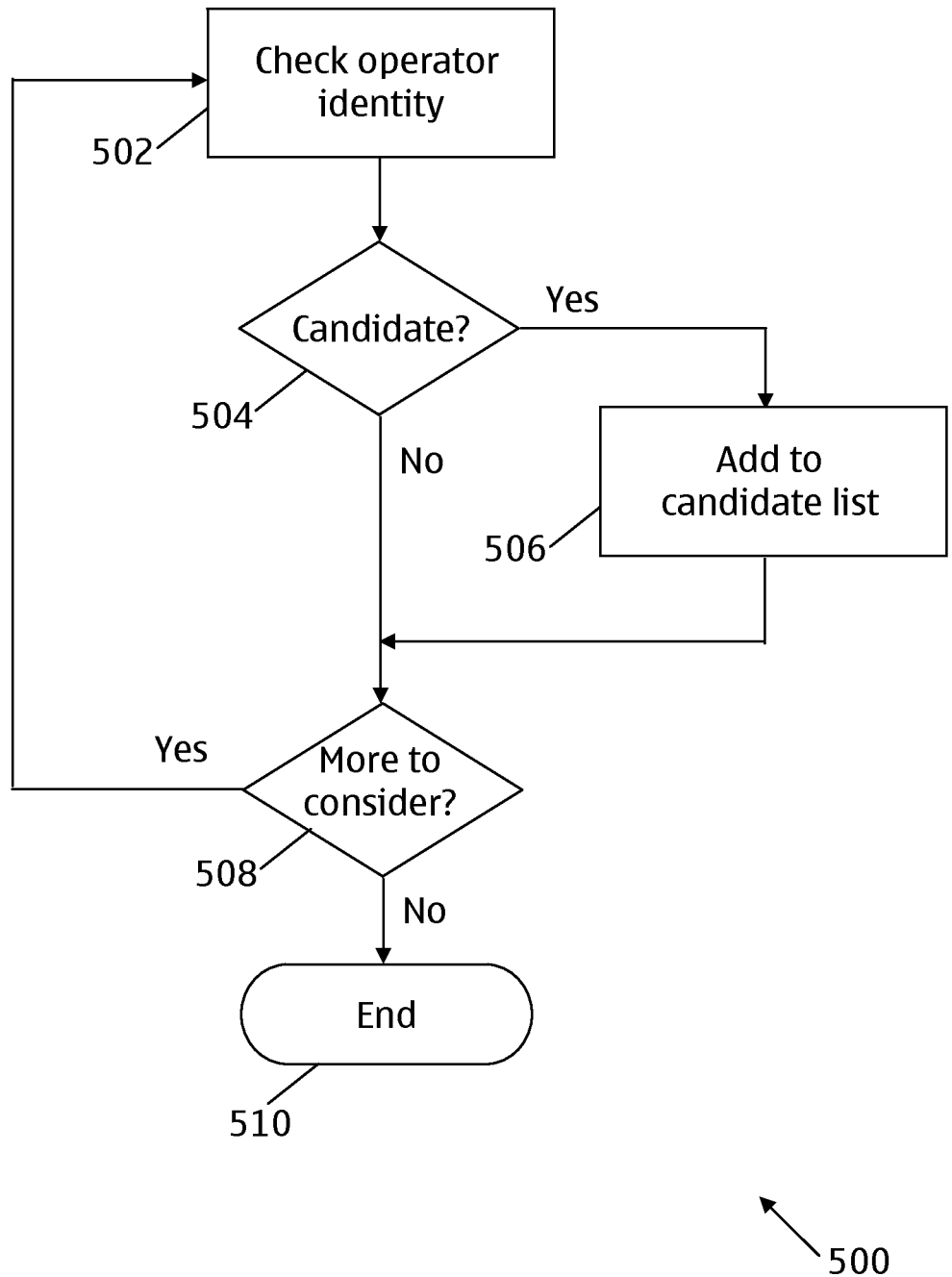
FIG. 8 is a flow chart showing an algorithm in accordance with an aspect of the present invention.

FIG. 8 shows a flow chart, indicated generally by the reference numeral 500, showing an algorithm in accordance with an aspect of the present invention. The algorithm 500 shows the use of the management objects described herein to enable a mobile communication device to detect legitimate candidate policies and/or discovery information based on a stored operator identity of an ANDSF server that originally provided the data.

The algorithm 500 starts at step 502, where a portion of a management object containing policy and/or discovery information is considered. The operator identity associated with the data (identifying the server that originally provided the data) is considered at step 502. The algorithm 500 then moves to step 504 where it is determined whether or not the data concerned is a legitimate candidate. The step 504 typically includes determining whether the operator identity of the data concerned matches the operator identity of the network within which the mobile communication device is located. If there is a match, then the data is identified as a candidate and added to a candidate list (at step 506); otherwise step 506 is omitted. Either way, the algorithm 500 moves to 508 where it is determined whether or not any other possible candidate policies and/or discovery information exist. If so, the algorithm 500 returns to step 502 where it is repeated based on the next candidate data; otherwise, the algorithm terminates at step 510.

If the user device is within the home network, then the candidate operator is the H-ANDSF operator. If the user device is roaming, then the candidate operators are the HPLMN and the current VPLMN. All policies within these operators may be candidates for access network selection.

Figure 9:
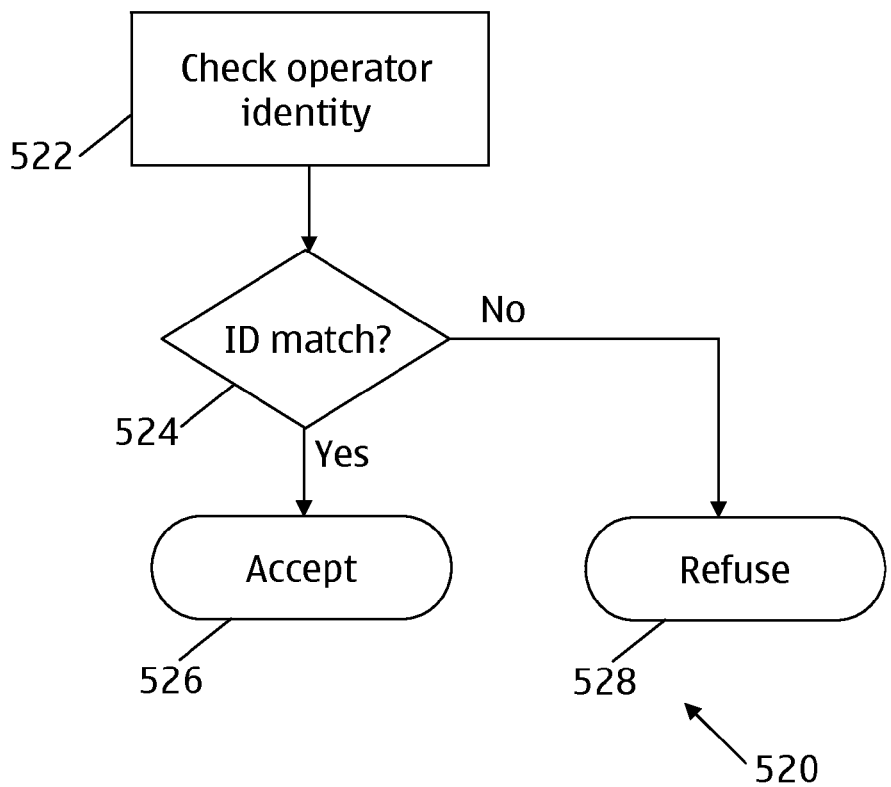
FIG. 9 is a flow chart showing an algorithm in accordance with an aspect of the present invention.

FIG. 9 shows a flow chart, indicated generally by the reference numeral 520, showing an algorithm in accordance with an aspect of the present invention. The algorithm 520 shows the use of the management objects described herein to enable a mobile communication device to decide whether or not to allow a particular ANDSF server to update a portion of a management object stored at the mobile communication device.

The algorithm 520 starts at step 522, where the portion of the management object that the server wants to modify is considered. The operator identity associated with the data (identifying the server that originally provided the data) is considered at step 522. The algorithm 520 then moves to step 524 where it is determined whether or not the operator identity associated with the data matches the operator identity of the server wanting to modify the data. If there is a match, then the algorithm 520 moves to step 526, where the server is allowed to modify the data; the algorithm then terminates. If there is not a match, then the algorithm 520 moves to step 528 where the server is not allowed to modify the data; the algorithm then terminates.

Figure 10:
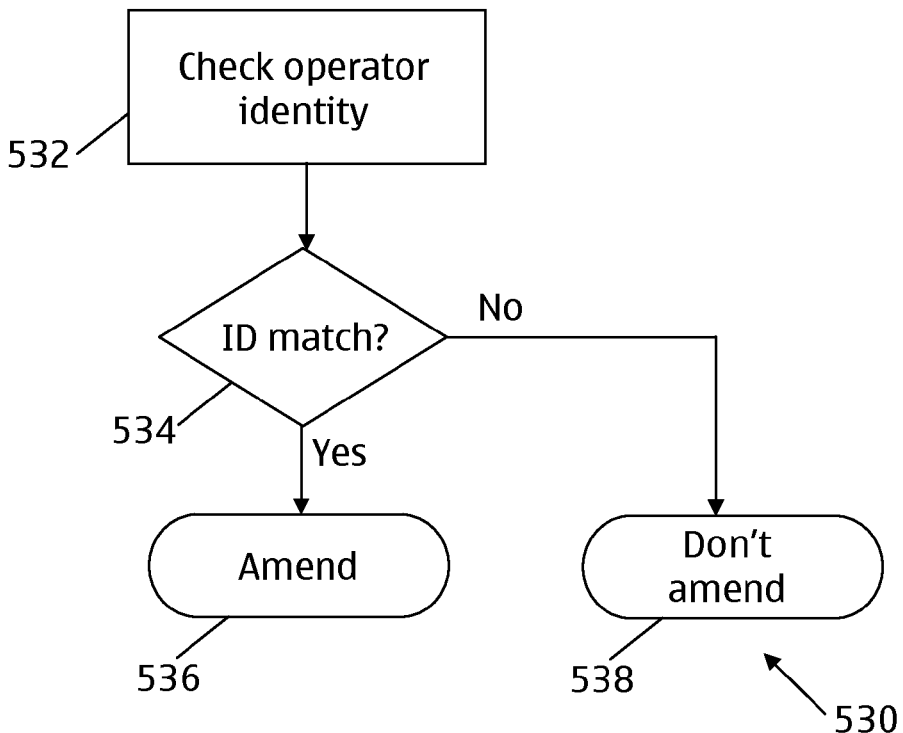
FIG. 10 is a flow chart showing an algorithm in accordance with an aspect of the present invention.

FIG. 10 shows a flow chart, indicated generally by the reference numeral 530, showing an algorithm in accordance with an aspect of the present invention. The algorithm 530 shows the use of the management objects described herein to enable a server (such as an ANDSF server) to decide whether or not to update a portion of a management object stored at the mobile communication device.

The algorithm 530 starts at step 532, where the portion of the management object that the server wants to modify is considered. The operator identity associated with the data (identifying the server that originally provided the data) is considered at step 532. The algorithm 530 then moves to step 534 where it is determined whether or not the operator identity associated with the data matches the operator identity of the server wanting to modify the data. If there is a match, then the algorithm 530 moves to step 536, where the server amends the data; the algorithm then terminates. If there is not a match, then the algorithm 530 moves to step 538 where the server does not amend the data; the algorithm then terminates.

Several exemplary Management Objects that are variants of the standard ANDSF MO have been described herein. The present invention is intended for use with network selection data, such as ANDSF data. The exemplary formats of ANDSF data structures provided here are by way of example only. Many modifications to the data structures could be provided whilst still being within the scope of the present invention. In particular, it should be noted that the ANDSF MO is likely to change over time. The present application is intended to encompass any such modification to the ANDSF MO, provided that an operator identity is included within the ANDSF MO.

Moreover, the present invention is not restricted to ANDSF. The invention could be used with other forms of network selection data; in particular, the present application is intended to encompass any mobile telecommunication network selection data structure that includes an operator identity stored within the data structure.

The embodiments of the invention described above are illustrative rather than restrictive. It will be apparent to those skilled in the art that the above devices and methods may incorporate a number of modifications without departing from the general scope of the invention. It is intended to include all such modifications within the scope of the invention insofar as they fall within the scope of the appended claims.

The invention claimed is:

1. A method of controlling the use of mobile telecommunications network selection data by a user device, wherein said network selection data in the form of a tree structure is stored at the user device, the method comprising:

checking at least one of a first and a second operator identity associated with the network selection data, wherein the at least one of the first and the second operator identity identifies an original provider of the said network selection data and is located in a path of the tree structure; and determining based on the original provider identified by the at least one of the first and the second operator identity whether the original provider of the said network selection data is such that said user device can make use of said data, wherein the tree structure comprises:

parent nodes being a parent policy node containing multiple instances of policies for intersystem mobility relating to respective operators and a parent discovery node containing multiple instances of access network discovery information relating to the respective operators, a first policy instance and a first discovery instance relating to a first operator wherein each of the first policy instance and the first discovery instance contain the first operator identity as a leaf located below a first policy node and a first discovery node, respectively, and a second policy instance and a second discovery instance of a second operator, wherein each of the second policy instance and the second discovery instance contain the second operator identity as a leaf located below a second policy node and a second discovery node, respectively, wherein the first operator identity leaves are linked to the parent nodes via respective single intermediate nodes being the first policy node and being the first discovery node, and the second operator identity leaves are linked to the parent nodes via respective single intermediate nodes being the second policy node and being the second discovery node.

2. A method as claimed in claim 1, wherein determining whether the original provider of said network selection data is such that said user device can make use of said data includes determining whether said original provider provides data for a home network of the user device.

3. A method as claimed in claim 1, wherein determining whether the original provider of said network selection data is such that said user device can make use of said data includes determining whether said original provider provides data for a network currently being visited by the user device.

4. A method as claimed in claim 1, wherein the at least one of the first and the second operator identity is stored by specifying a naming format of one or more nodes or leaves of said data structure.

5. A method as claimed in claim 1, wherein the at least one of the first and the second operator identity is stored as a property of a node of the data structure.

6. A method as claimed in claim 1, wherein the at least one of the first and the second operator identity is a public land mobile network identity.

7. A method as claimed in claim 1, wherein said mobile telecommunications network selection data is automatic network discovery and selection function data.

8. A method as claimed in claim 1, wherein the method is carried out by an entity seeking to edit the said network selection data.

9. A method as claimed in claim 8, wherein the editing of the network selection data is being sought by an automatic network discovery and selection function server.

10. A method as claimed in claim 1, wherein the method is carried out by the user device.

11. A method as claimed in claim 1, wherein the network selection data is stored at the user device in a data structure.

12. A method as claimed in claim 11 wherein the data structure comprises an operator identity identifying an originator of mobile telecommunications network selection data stored within the data structure.

13. A method as claimed in claim 12, wherein the at least one of the first and the second operator identity is stored by specifying a naming format of one or more nodes or leaves of said data structure.

14. A method as claimed in claim 12, wherein the at least one of the first and the second operator identity is stored as a property of a node of the automatic network discovery and selection function management object.

15. A method as claimed in claim 11, wherein the mobile telecommunications network selection data is automatic network discovery and selection function data.

16. A mobile communication device comprising:
a first processor for checking at least one of a first and a second operator identity associated with network selection data stored at the user device, the network selection data being in the form of a tree structure, wherein the at least one of the first and the second operator identity identifies an original provider of the said network selection data and is located in a path of the tree structure; and
a second processor for determining based on the original provider identified by the at least one of the first and the second operator identity whether the original provider of the said network selection data is such that said user device can make use of said data,
wherein the tree structure comprises parent nodes being a parent policy node containing multiple instances of policies for intersystem mobility relating to respective operators and a parent discovery node containing multiple instances of access network discovery information relating to the respective operators,
a first policy instance and a first discovery instance relating to a first operator, wherein each of the first policy instance and the first discovery instance contain the first oerator identity as a leaf located below a first policy node and a first discover node respectively, and
a second policy instance and a second discovery instance of a second operator, wherein each of the second policy instance and the second discovery instance contain the second operator identity as a leaf located below a second policy node and a second discovery node, respectively, wherein
the first operator identity leaves are linked to the parent nodes via respective single intermediate nodes being the first policy node and being the first discovery node, and
the second operator identity leaves are linked to the parent nodes via respective single intermediate nodes being the second policy node and being the second discovery node.

17. A computer program product containing computer code embodied on a non-transitory computer readable medium configured to control a processor to perform a process comprising:
checking at least one of a first and a second operator identity associated with mobile communication network selection data stored at a user device, the mobile communication network selection data being in the form of a tree structure, wherein the at least one of the first and a second operator identity identifies an original provider of the said mobile communication network selection data and is located in a path of the tree structure; and
determining based on the original provider identified by the at least one of the first and the second operator identity whether the original provider of the said mobile communication network selection data is such that said user device can make use of said data,
wherein the tree structure comprises:
parent nodes being a parent policy node containing multiple instances of policies for intersystem mobility relating to respective operators and a parent discovery node containing multiple instances of access network discovery information relating to the respective operators,
a first policy instance and a first discovery instance relating to a first operator, wherein each of the first policy instance and the first discovery instance contain the first operator identity as a leaf located below a first policy node and a first discovery node, respectively, and
a second policy instance and a second discovery instance of a second operator, wherein each of the second policy instance and the second discovery instance contain the second operator identity as a leaf located below a second policy node and a second discovery node, respectively, wherein
the first operator identity leaves are linked to the parent nodes via respective single intermediate nodes being the first policy node and being the first discovery node, and
the second operator identity leaves are linked to the parent nodes via respective single intermediate nodes being the second policy node and being the second discovery node.

* * * * *